United States Patent [19]

Cleverley et al.

[11] Patent Number: 5,534,168
[45] Date of Patent: Jul. 9, 1996

[54] PREPARATION OF OVERBASED MAGNESIUM SULPHONATES

[75] Inventors: John A. Cleverley, Didcot; Robert A. Wardle, Abingdon; Joseph M. Swietlik, Abingdon; John F. Marsh, Abingdon; Jeremy R. Spencer, Oxford, all of United Kingdom

[73] Assignee: Exxon Chemical Patents Inc., Linden, N.J.

[21] Appl. No.: 142,370

[22] PCT Filed: May 19, 1992

[86] PCT No.: PCT/EP92/01113

§ 371 Date: Nov. 23, 1993

§ 102(e) Date: Nov. 23, 1993

[87] PCT Pub. No.: WO92/20694

PCT Pub. Date: Nov. 26, 1992

[30] Foreign Application Priority Data

May 24, 1991 [GB] United Kingdom ............ 9111257

[51] Int. Cl.⁶ ........................................... C10M 125/00
[52] U.S. Cl. ................... 508/396; 252/397; 252/401; 252/34; 252/39
[58] Field of Search .................. 252/33.2, 33.4, 252/25, 18, 34, 39; 423/635, 636

[56] References Cited

U.S. PATENT DOCUMENTS

| 3,865,737 | 2/1975 | Kemp ....................... 252/33.4 |
| 3,980,753 | 9/1976 | Grill et al. ................. 423/636 |
| 4,129,589 | 12/1978 | Eliades et al. . |
| 4,148,740 | 4/1979 | Cease et al. ............... 252/33.2 |
| 4,192,758 | 3/1980 | Dickey et al. ............. 252/33 |
| 4,443,425 | 4/1984 | Sopp et al. ............... 423/635 |
| 4,617,135 | 10/1986 | Muir .......................... 252/33.2 |

FOREIGN PATENT DOCUMENTS 0394033  10/1990  European Pat. Off. .

*Primary Examiner*—Margaret Medley
*Attorney, Agent, or Firm*—Estelle C. Bakun

[57] ABSTRACT

The use of magnesium oxide of specified, low, reactivity in a process for the production of overbased magnesium sulphonates, together with the introduction of water and an alcohol, into the reaction mixture during carbonation, makes it possible to prepare high base number products which have very low post carbonation sediments and which can be purified by rapid filtration.

11 Claims, No Drawings

PREPARATION OF OVERBASED MAGNESIUM SULPHONATES

The present invention relates to a process for the production of overbased magnesium sulphonates and to overbased magnesium sulphonates prepared by the process. The overbased magnesium sulphonates prepared by the process are particularly useful as additives for oil-based compositions, especially lubricating oils, and the invention also relates to oil-based compositions containing these overbased metal sulphonates.

Overbased magnesium sulphonates are well known, as is their use as additives in oil-based compositions, for example, lubricants, greases and fuels. They function as detergents and acid neutralizers, thereby reducing wear and corrosion and, when used in engines, extending engine life. Other overbased metal sulphonates often used for the same purpose are overbased calcium sulphonates.

Many processes have been proposed for producing overbased sulphonates of calcium and magnesium, the preferred processes generally involving the carbonation, in the presence of an organic solvent or diluent, of a mixture of an oil-soluble sulphonate and/or an oil-soluble sulphonic acid and an excess of a compound of the desired metal above that required to react with any acid present. It is known that overbased magnesium sulphonates are in general more difficult to prepare than the corresponding calcium compounds, and processes proposed for preparing overbased magnesium sulphonates have involved various special measures, for example, the use of particular reaction conditions and/or the incorporation of one or more additional substances into the mixture to be carbonated, such additional substances including, for example, water, alcohols, and promoters of various types. Many of the previously proposed processes also, or alternatively, require the use of magnesium in a relatively reactive form, for example, in the form of a magnesium compound having a certain minimum degree of reactivity.

Examples of prior specifications disclosing the use of particular reaction conditions or steps in the preparation of overbased magnesium sulphonates are U.S. Pat. No. 3,629,109, which discloses a multistage carbonation process, U.S. Pat. No. 4,129,589, which claims the use of specified temperature conditions, or the addition of additional water and alcohol during carbonation, when carbonating a mixture containing "light" (active) magnesium oxide, U.S. Pat. No. 4,148,740, which claims the use of specified temperatures and proportions of carbon dioxide when carbonating a mixture containing "activated" magnesium oxide, U.S. Pat. No. 4,192,758, which claims carbonating at the "critical carbonation rate", and which refers to the preparation of overbased additives as "a complex and highly unpredictable art", British Specification No. 2 135 330 A, which claims a continuous countercurrent process, and British Specification No. 2 036 781 A, which claims the use of specified carbonation temperatures and proportions of carbon dioxide for carbonating a mixture which includes a $C_1$ to $C_5$ alcohol or a $C_3$ to $C_6$ ketone.

Examples of prior specifications directed primarily to the use of additional substances in the mixture to be carbonated are U.S. Pat. No. 4,617,135, which claims the use of a reaction mixture containing water, an alkanol, and a combination of specified first and second promoters, U.S. Pat. No. 3,928,216, which claims the use of a promoters system comprising a hydroxy-containing compound and a salt of boric acid and an aliphatic hydrocarbyl diamine or polyamine containing from 2 to 8 carbon atoms, U.S. Pat. No. 3,853,774, which claims the use of a reaction mixture containing water, a lower alkanol and naphthenic acids, British Specifications Nos. 2 037 801 A and 2 037 310 A, which claim the use of reaction mixtures containing a $C_4$ to $C_6$ diketone and a $C_8$ to $C_{10}$ carboxylic acid respectively, British Specification No. 2 175 598 A, which claims the use of a reaction system containing water, alcohol, a first promoter comprising a succinic anhydride or a derivative thereof and a co-promoter selected from naphthenic acid and a water-soluble carboxylic acid, European Specification No. 13808A, which claims the use of a reaction system containing water, a $C_3$ to $C_6$ ketone, and one or more reaction promoters selected from the group consisting of carboxylic acids or salts thereof, amines and $C_4$ to $C_6$ diketones, European Specification No. 323 088 A, wherein the claimed process uses a reaction mixture comprising an ashless dispersant, and U.S. Pat. No. 4,647,387, wherein the reaction mixture in the claimed process comprises water, alcohol, a first promoter comprising a $C_6$ to $C_{20}$ succinic anhydride or derivative thereof and a co-promoter selected from naphthenic acid and a water-soluble carboxylic acid.

Among prior specifications disclosing the use of particular sources of magnesium are U.S. Pat. No. 3,150,089, which requires magnesium metal as starting material, U.S. Pat. No. 4,225,446, in which the claimed processes start from a magnesium sulphonate having a Total Base Number in excess of about 200, U.S. Pat. No. 3,865,737, which requires the use of magnesium oxide having a bulk density corresponding to a calcining temperature of below about 1000° C. (that is, "light" or "reactive" magnesium oxide), and U.S. Pat. Nos. 4,129,589 and 4,148,740, referred to above, both of which claim the use of active magnesium oxides.

It is important that overbased materials to be used as additives for oil-based compositions such as lubricating oils and fuels be clear liquids and be free of sediment. The product obtained at the end of carbonation in processes for preparing overbased magnesium sulphonates will contain some unwanted material (normally hard sediment and/or gelatinous material formed during the overbasing process). From an economic standpoint, it is desirable to be able to remove the sediment quickly and simply, preferably by filtration, and it is also desirable that the amount of sediment to be removed be also low as possible. If gelatinous material is present, this will tend to inhibit or prevent filtration by blocking the filter. Where purification by filtration is possible, it is desirable that this be effected as rapidly as possible. If large amounts of sediment are present, the sediment must normally be removed by centrifuging rather than by filtration, and even small amounts of sediment may have a tendency to block filters if the process is carried out on a large scale, this tendency being particularly marked if the system contains gelatinous material formed during the overbasing process.

The proportion of sediment in the reaction mixture immediately after carbonation (that is, before centrifuging or filtration to remove sediment) is usually known as the "post carbonation sediment", or "PCS", and is normally expressed as volume % PCS based on the volume of the reaction mixture. When comparing proportions of sediment in different systems, it is important that the % PCS be calculated on comparable systems, preferably "stripped" systems free from any volatile materials, for example, water, methanol, and solvents, which are included in the reaction mixture for the purposes of the reaction but which are not required in the final overbased product. In some processes these volatile materials are not removed until after removal of the sediment, and the % PCS reported is thus based on the volume of a reaction system which still contains the volatile materials, but by appropriate calculation it is possible to arrive, for comparison purposes, at a value for the % PCS in a notional system free from the volatile materials.

It is normally desirable that overbased materials to be used as additives for oil-based compositions have a relatively high basicity, since this results in the most economic use of the metal. The basicity is usually expressed in terms of the Total Base Number (TBN) of the product, the TBN being the number of milligrams of potassium hydroxide equivalent to 1 gram of the product when titrating with a strong acid. For some applications, it is preferred that the TBN be at least 350, preferably at least 400, mg KOH/g, as measured by ASTM D2896. Processes for the production of overbased materials of high TBN, however, frequently result in significantly higher sediment levels at the end of the carbonation step than do processes for producing overbased materials of lower TBN, or require the use of high levels of promoters if relatively low sediment levels are to be obtained. The use of high levels of promoters is in general undesirable on, for example, economic grounds and/or because the promoter imparts undesired properties to an intermediate or final product. Thus, for example, in some cases a high level of promoter may lead to a post-carbonation product of high viscosity which can only be filtered relatively slowly.

Many of the processes described in the prior art for the preparation of overbased magnesium sulphonates involve the removal of substantial quantities of sediment, predominantly unreacted magnesium starting materials. U.S. Pat. No. 4,192,758, for example, indicates that "much of the oxide ends up as undispersed solid which is difficult to filter". It is stated in U.S. Pat. No. 4,617,135 that the process described therein makes it possible to produce overbased magnesium sulphonates having "extremely low post carbonation sediment", but it is apparent that, although the levels of sediment may be low compared with those obtained in previously proposed processes, they are still relatively high. Thus, the specification indicates that the "% PCS produced by the present reaction is generally less than 5.0% by volume of the reaction mixture", and the lowest value quoted is 2%. Further, it is clear from the Examples of U.S. Pat. No. 4,617,135 that the % PCS values reported in the specification are based on the reaction mixture before heating to strip volatile additives such as water, methanol and naphtha. The % PCS values calculated on systems free from volatile materials will be higher than the values quoted in the specification. Thus, the % PCS of 3.8 quoted in Example 1 of U.S. Pat. No. 4,617,135, for example, approaches 10 when calculated on the basis of a system free from volatile additives, and a % PCS of 2 approaches 5 when calculated on the same basis.

British Specification No. 2 175 598 A, which is primarily concerned with overbased magnesium sulphonates which are highly water-tolerant, and which do not rely on the presence of post-sulphonate formation water-tolerance additives to enable them to pass the Cummins Test, refers in passing to the maintenance of "minimum post carbonation sediment" but the lowest % PCS reported is 2 (in Example 1), the remaining Examples quoting % PCS values of 5.4 (when n-octenyl succinic anhydride was used as promoter) to 8.8. (It appears from the details of the process immediately preceding the Examples that the quoted % PCS values may be the values before stripping.) There is no teaching of a method which makes it possible to obtain products which contain significantly lower levels of sediment after stripping and which can be purified by rapid filtration.

In U.S. Pat. No. 3,865,737, sediments are measured by the B. S. & W. test and are reported as ml.ppt./100 g. product, and it is stated that materials having a B. S. & W. value of up to 10% can be used commercially since the B. S. & W. value can be improved by centrifugation and filtration. The lowest B. S. & W. value quoted is 0.6%, but this is for a product with an acetic base number of only 320. As indicated above, processes for the production of materials with higher TBNs would be expected to result in significantly higher levels of sediment.

Despite the numerous previous proposals for preparing overbased magnesium sulphonates, of which the processes disclosed in the specifications discussed above are only a selection, there remains a need for a process suitable for preparing such substances, particularly overbased magnesium sulphonates having a relatively high TBN, in which relatively low levels of post carbonation sediment can be obtained (preferably without the need to use high levels of promoter), and relatively rapid filtration of the sediment-containing reaction product is possible.

The applicants have surprisingly found that the use, as the source of magnesium, of magnesium oxide of relatively low reactivity, in a reaction system which comprises, among other components, water and a water-soluble alcohol, in combination with the introduction of part of the water and at least part of the alcohol, into the mixture during carbonation, makes it possible to obtain overbased magnesium sulphonates of high TBN which have extremely low % PCS values, typically less than 2%, and in some cases less than 1%, based on a reaction system free from volatile materials, and which can be filtered relatively rapidly, typically at a rate of at least 150, preferably at least 200, and especially at least 250, kg/m$^2$/hour when working on a large scale, these results being obtained without the use of unacceptably large proportions of promoters. The products may also have relatively low viscosities. The fact that very low amounts of sediment may be obtained in accordance with the invention is advantageous from the ecological viewpoint when working on a large scale, as there is less waste material to be disposed of.

The present invention provides a process for the production of an overbased magnesium sulphonate which comprises carbonating a mixture comprising:

(a) an oil-soluble sulphonate and/or an oil-soluble sulphonic acid;

(b) magnesium oxide in excess of that, if any, required to react completely with (a);

(c) a hydrocarbon solvent;

(d) water;

(e) a water-soluble alcohol; and (f) a promoter, the magnesium oxide used to prepare the mixture having a citric acid number (as hereinafter defined) of greater than 200 seconds and a surface area measured by the BET single point method of less than 12 m$^2$/g, and the particle size of at least 92 volume % of the magnesium oxide being greater than 2 µm, and part of the water, and preferably at least part of the water-soluble alcohol, being introduced into the mixture during carbonation, the total amount of water introduced into the mixture, including any introduced before carbonation but excluding water generated by chemical reactions, being at least 0.5 mole per mole of the excess specified in (b). The invention also provides the use of a magnesium oxide having a citric acid number, surface area and particle size distribution as specified above to give reduced sediment in a process for the preparation of an overbased magnesium sulphonate.

The sulphonate or sulphonic acid used in the process of this invention may be natural or synthetic, the synthetic alkylaryl sulphonates and sulphonic acids being preferred. The overbased magnesium sulphonates with which this invention is concerned comprise an oil solution of the magnesium sulphonate which acts as a surfactant to disperse colloidal magnesium derivatives, for example, magnesium carbonate, oxide and/or hydroxide. It is thus important that the sulphonic acid or sulphonate be oil-soluble. A mixture of substances selected from oil-soluble sulphonic acids and oil-soluble sulphonates may, of course, be used.

The proportion of dispersed colloidal magnesium derivatives such as magnesium carbonate, oxide and/or hydroxide, in the overbased magnesium sulphonates determines the basicity of the products. The magnesium oxide used as a starting material is used in an amount sufficient to give the desired TBN in the product. Advantageously, the magnesium oxide is used in a total quantity corresponding to 1 to 45, preferably 1 to 25, equivalents of magnesium for each equivalent of sulphonic acid: where magnesium oxide is added to a system already containing a magnesium sulphonate, the equivalents of magnesium and sulphonic acid corresponding to the magnesium sulphonate are included in the above figures. Pan of the magnesium oxide may, if desired, be added to the reaction system during carbonation.

As indicated above, an important feature of the present invention is the use of magnesium oxide of relatively low reactivity. As also indicated above, many of the previously proposed processes for making overbased magnesium sulphonates specify the use of relatively reactive forms of magnesium oxide, commonly known as "light", "active", or "caustic burned" magnesium oxides. These forms of magnesium oxide have a relatively low density and relatively high surface area, in contrast to "heavy" or "deadburned" forms of magnesium oxide, which are relatively dense and of relatively low surface area and tend to be relatively inert chemically. The magnesium oxides used in accordance with the invention are "heavy" rather than "light", although not all heavy magnesium oxides are suitable for use in accordance with the invention.

As indicated above, the magnesium oxides suitable for use in accordance with the invention have a citric acid number (as hereinafter defined) of greater than 200 seconds and a surface area measured by the BET single point method of less than 12 $m^2/g$, the particle size of at least 92 volume % of the magnesium oxide being greater than 2 μm.

As defined herein, the citric acid number is the time in seconds required to neutralise, at 22° C., a stirred mixture of 1.7 g of the magnesium oxide, 100 ml water, and 100 ml of a citric acid solution containing 26 g citric acid monohydrate and 0.1 g phenolphthalein in 1 litre of aqueous solution. Neutralisation is indicated by the mixture turning pink. The citric acid number of the magnesium oxide used in accordance with the invention is advantageously at most 700 seconds, and is advantageously in the range of from 200 to 600 seconds, preferably 400 to 500 seconds.

The BET single point method for measuring the surface areas of particulate solids is described in the Journal of Analytical Chemistry, Vol. 26, No. 4, pages 734 to 735 (1954)—M. J. Katz, An Explicit Function for Specific Surface Area. The surface area, measured by this method, of preferred forms of magnesium oxide for use in accordance with the invention is advantageously less than 10$m^2/g$, and is preferably in the range of from 2 to 10 $m^2/g$.

The particle size of at least 92 volume % of the magnesium oxide used in accordance with the invention is greater than 2 μm. Advantageously, at least 94 volume % of the magnesium oxide has a particle size of greater than 2 μm.

The magnesium oxide used in accordance with the invention preferably has a purity, as measured by EDTA titration, of at least 95%. In the EDTA titration method, a sample of the magnesium oxide is dissolved in dilute hydrochloric acid, and the solution is buffered in a pH of about 10 and then titrated with a solution of the disodium salt of ethylene diamine tetra-acetic acid. The disodium salt forms a complex with the magnesium ions in the solution, so that the concentration of magnesium ions can be calculated from the amount of the disodium salt used. The mass of magnesium, expressed as magnesium oxide, is compared with the mass of the original sample to give the percentage purity.

The hydrocarbon solvent used in the carbonation mixture is a solvent in which the sulphonic acid and the overbased sulphonate are at least partially soluble, and is used in an amount sufficient to keep the mixture fluid during carbonation. The solvent is advantageously volatile, preferably with a boiling point at atmospheric pressure of below 150° C., so that it can be removed after the completion of carbonation. Examples of suitable hydrocarbon solvents are aliphatic hydrocarbons, for example, hexane or heptane, and aromatic hydrocarbons, for example, benzene, toluene or xylene, the preferred solvent being toluene. The fact that aromatic and aliphatic solvents can be used is an advantage over some previously proposed processes, which are restricted to one or the other. Typically, the solvent is used in an amount of about 5 parts by mass per part by mass of the magnesium oxide.

As well as the hydrocarbon solvent, the carbonation mixture may comprise a non-volatile diluent oil, for example, a mineral oil, although the use of such an oil is not essential. In the process of the invention a non-volatile diluent oil is preferably only used if such an oil is present in the sulphonic acid starting material, although the addition of diluent oil after the completion of carbonation may in some cases be advantageous for facilitating handling of the product.

The total amount of water introduced into the mixture, including any introduced before carbonation but excluding water generated in situ by chemical reactions, is at least 0.5 mole, advantageously at least 1 mole, per mole of the excess magnesium oxide (that is, the magnesium oxide available to form colloidally dispersed basically-reacting products). Advantageously, the total amount of water introduced does not exceed 5 moles, and preferably does not exceed 2.5 moles, per mole of overbasing magnesium oxide.

Part of the water is introduced into the carbonation mixture during carbonation, part being present in the mixture before commencement of carbonation. Advantageously, 10 to 90 mass %, and preferably 30 to 60 mass %, of the total amount of introduced water, is present in the mixture before commencement of carbonation, and 90 to 10 mass %, preferably 70 to 40 mass %, of the total amount of water is added during carbonation. The most appropriate ratio of the proportion of water present before commencement of carbonation to the proportion added during carbonation will vary from system to system, and can be determined by routine experiment. The manner in which the water is introduced into the mixture during carbonation is discussed in more detail below.

As examples of suitable water-soluble alcohols for use in accordance with the invention there may be mentioned lower aliphatic alkanols, alkoxy alkanols, and mixtures of two or more of such compounds, wherein the maximum number of carbon atoms is usually at most 5. Examples of suitable alkanols are methanol, ethanol, isopropanol, n-propanol, butanol and pentanol. Methanol is preferred. An example of a suitable alkoxy alkanol is methoxy ethanol.

As indicated above, at least part of the alcohol introduced into the carbonation mixture during carbonation. Advantageously, at least 10 mass %, and preferably 40 to 70 mass %, of the total amount of alcohol introduced (this **total amount" excluding any alcohol used when neutralising a sulphonic acid, if present), is introduced during carbonation. The most appropriate ratio of the proportion of alcohol present before commencement of carbonation to the proportion added during carbonation will vary from system to and can be determined by routine experiment, as can the most appropriate relative proportions of water and alcohol. For guidance, the mass ratio of water to alcohol will typically be in the range of from 10 to 0.1 to 1, especially 7 to 1.5 to 1.

The water introduced into the reaction mixture during carbonation, and/or the alcohol introduced during carbonation, is/are advantageously introduced substantially continuously, preferably at a substantially constant rate. The term "substantially continuously" includes the case where the water and/or alcohol is/are introduced in a plurality of small portions, with short time intervals between the addition of individual portions, but not the case where the water and/or alcohol is are introduced in one or more relatively large batches. Where both water and alcohol are introduced into the mixture during carbonation, these are advantageously introduced over the same period of time, and may conveniently be introduced together. Advantageously, the water and alcohol introduced during carbonation are introduced over at least the first 20% of the carbonation period, advantageously over at least the first 50%, preferably over at least the first 75%, and especially over at least the first 90%, of the said period. If desired, the water and alcohol may be introduced over different periods of time, but this is not normally preferred.

Any promoter or promoter system may be used in the process of the invention, for example, any of the promoters mentioned in the specifications referred to herein as being suitable for use in preparing overbased magnesium sulphonates. Examples of suitable promoters are ammonia, ammonium compounds, amines, (for example, ethylene diamine), ketones, naphthenic acids and carboxylic acids or anhydrides, including mixtures of oil-soluble and water-soluble organic acids as described in U.S. Pat. No. 4,617,135. Suitable carboxylic acids/anhydrides include the $C_8$ to $C_{12}$ carboxylic acids referred to in British Specification No. 2 037 310 A (for example, n-octanoic acid, n-decanoic acid, and neodecanoic acid), and substituted, for example, alkenyl-substituted, succinic acids, which are preferably used in the form of their anhydrides (for example, octenyl succinic anhydride). The use of a process in accordance with the invention may make it possible to obtain lower sediment levels using the same amount of promoter, or the same sediment levels using a reduced amount of promoter.

To ensure maximum conversion of magnesium oxide to colloidal products, carbonation is normally continued until there is no further significant uptake of carbon dioxide. The temperature at which carbonation is effected depends on the promoter system used. The minimum temperature that may be used is that at which the carbonation mixture remains fluid, and the maximum is the decomposition temperature of the component with the lowest decomposition temperature, or the lowest temperature at which an unacceptable amount of one or more volatile components is lost from the mixture. Carbonation is preferably carried out with the apparatus set for total reflux. The temperature of the reactants is normally adjusted to a chosen value before carbonation is commenced, and is then allowed to vary during carbonation as the reaction proceeds. Generally carbonation is effected at a temperature in the range of from 20° to 200° C., preferably 40° to 70° C.

When there is no further significant uptake of carbon dioxide, the carbonation mixture is stripped to remove volatile materials such as water, the alcohol, and volatile solvent(s), and any solids remaining in the mixture are removed, preferably by filtration. The mixture may be stripped before or after the solids are removed. Further carbon dioxide may if desired be passed through the reaction mixture during stripping, the carbon dioxide acting primarily to flush out volatile materials. As indicated above, the invention surprisingly makes it possible to obtain overbased magnesium sulphonates having high TBNs, having an extremely low proportion of post carbonation sediment, and capable of purification by filtration.

Overbased magnesium sulphonates obtained by the process of the invention are useful as additives for oil-based compositions, for example, lubricants, greases and fuels, and the invention thus also provides such compositions containing the overbased magnesium sulphonates. When used in engine lubricants, the overbased magnesium sulphonates neutralise acids formed by the operation of the engine and help to disperse solids in the oil to reduce the formation of harmful deposits. They also enhance the antirust properties of the lubricants. The amount of overbased magnesium sulphonate that should be included in the oil-based composition depends on the type of composition and its proposed application. Automotive crankcase lubricating oils preferably contain 0.01% to 5 mass % of the overbased magnesium sulphonate, on an active ingredient basis, based on the mass of the oil.

The overbased magnesium sulphonates prepared in accordance with the invention are oil-soluble or (in common with certain of the other additives referred to below) are dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the materials are, for instance, soluble or stably dispersible in oil to an extent sufficient to exert their intended effect in the environment in which the oil is employed. Moreover, the additional incorporation of other additives may also permit incorporation of higher levels of a particular additive, if desired.

Additives, including the overbased magnesium sulphonates prepared in accordance with the present invention, can be incorporated into a base oil in any convenient way. Thus, they can be added directly to the oil by dispersing or by dissolving them in the oil at the desired level of concentration. Such blending can occur at room temperature or an elevated temperature.

Overbased magnesium sulphonates produced in accordance with the present invention may be useful in fuel oils or lubricating oils. The normally liquid fuel oils are generally derived from petroleum sources, for example, normally liquid petroleum distillate fuels, although they may include those produced synthetically by the Fischer-Tropsch and related processes, the processing or organic waste material or the processing of coal, lignite or shale rock. Such fuel compositions have varying boiling ranges, viscosities, cloud and pour points, according to their end use as is well known to those skilled in the art. Among such fuels are those commonly known as diesel fuels, distillate fuels, for example, gasoline, heating oils residual fuels and bunker fuels, which are collectively referred to herein as fuel oils. The properties of such fuels are well known to those skilled in the art as illustrated, for example, by ASTM Specification D 396-73, available from the American Society for Testing Materials, 1916 Race Street, Philadelphia, Pa. 19103.

Middle distillate fuel oils include distillates boiling from about 120° to 725° F. (about 49° to 385° C.) (e.g., 375° to 725° F. (191° to 385° C.)), including kerosene, diesel fuels, home heating fuel oil, jet fuels, etc., and most preferably whose 20% and 90% distillation points differ by less than 212° F. (100° C.), and/or whose 90% to final boiling point range is between about 20° and 50° F. (about −7° and 10° C.) and/or whose final boiling point is in the range of 600° to 700° F. (about 316° to 371° C.).

Overbased magnesium sulphonates prepared in accordance with the invention are particularly useful in lubricating oil compositions which employ a base oil in which the mixtures are dissolved or dispersed. Base oils with which the overbased magnesium sulphonates may be used include those suitable for use as crankcase lubricating oils for spark-ignited and compression-ignited internal combustion engines, for example, automobile and truck engines, marine and railroad diesel engines. They may also be used, for example, in base oils suitable for use as aviation lubricants or as lubricants for two cycle, engines.

Synthetic base oils include alkyl esters of dicarboxylic acids, polyglycols and alcohols; poly-α-olefins, including polybutenes; alkyl benzenes; organic esters of phosphoric acids; and polysilicone oils.

Natural base oils include mineral lubricating oils which may vary widely as to their crude source, for example, as to whether they are paraffinic, naphthenic, mixed, or paraffinic-naphthenic, as well as to the method used in their production, for example, distillation range, straight run or cracked, hydrofined, solvent extracted and the like.

More specifically, natural lubricating oil base stocks which can be used may be straight mineral lubricating oil or distillates derived from paraffinic, naphthenic, asphaltic, or mixed base crude oils. Alternatively, if desired, various blended oils may be employed as well as residual oils, particularly those from which asphaltic constituents have been removed. The oils may be refined by any suitable method, for example, using acid, alkali, and/or clay or other agents such, for example, as aluminium chloride, or they may be extracted oils produced, for example, by solvent extraction with solvents, for example, phenol, sulphur dioxide, furfural, dichlorodiethyl ether, nitrobenzene, or crotonaldehyde.

The lubricating oil base stock conveniently has a viscosity of about 2.5 to about 12 cSt (about $2.5 \times 10^{-6}$ to about $12 \times 10^{-6}$ m$^2$/s) and preferably about 2.5 to about 9 cSt. (about $2.5 \times 10^{-6}$ to about $9 \times 10^{-6}$ m$^2$/s) at 100° C. Mixtures of synthetic and natural base oils may be used if desired.

The overbased magnesium sulphonates prepared in accordance with the present invention may be employed in a lubricating oil composition which comprises lubricating oil, typically in a major proportion, and the sulphonates, typically in a minor proportion, for example, in a proportion as indicated above. Additional additives may be incorporated in the composition to enable it to meet particular requirements. Examples of additives which may be included in lubricating oil compositions are other detergents and metal rust inhibitors, viscosity index improvers, corrosion inhibitors, oxidation inhibitors, friction modifiers, dispersants, anti-foaming agents, anti-wear agents, pour point depressants, and rust inhibitors.

Additional detergents and metal rust inhibitors include other metal salts, preferably overbased metal salts, of sulphonic acids, particularly calcium and sodium salts, and metal salts, preferably overbased metal salts, of sulphurized alkyl phenols, alkyl salicylates, naphthenates and other oil-soluble mono- and dicarboxylic acids.

Viscosity index improvers (or viscosity modifiers) impart high and low temperature operability to a lubricating oil and permit it to remain shear stable at elevated temperatures and also exhibit acceptable viscosity or fluidity at low temperatures. Suitable compounds for use as viscosity modifiers are generally high molecular weight hydrocarbon polymers, including polyesters, and viscosity index improver dispersants, which function as dispersants as well as viscosity index improvers. Oil soluble viscosity modifying polymers generally have weight average molecular weights of from about 10,000 to 1,000,000, preferably 20,000 to 500,000, as determined by gel permeation chromatography or light scattering methods.

Representative examples of suitable viscosity modifiers are polyisobutylene, copolymers of ethylene and propylene, polymethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Corrosion inhibitors, also known as anti-corrosive agents, reduce the degradation of metallic parts contacted by the lubricating oil composition. Illustrative of corrosion inhibitors are phosphosulphurized hydrocarbons and the products obtained by reaction of a phosphosulphurized hydrocarbon with an alkaline earth metal oxide or hydroxide, preferably in the presence of an alkylated phenol, and also preferably in the presence of carbon dioxide. Phosphosulphurized hydrocarbons may be prepared by reacting a suitable hydrocarbon, for example, a terpene or a heavy petroleum fraction of a $C_2$ to $C_6$ olefin polymer such, for example, as polyisobutylene, with from 5 to 30 mass % of a sulphide of phosphorus for ½ to 15 hours, at a temperature in the range of about 65° to about 315° C. Neutralization of the phosphosulphurized hydrocarbon may be effected in any suitable manner, for example, in the manner taught in U.S. Pat. No. 1,969,324.

Oxidation inhibitors, or antioxidants, reduce the tendency of mineral oils to deteriorate in service, evidence of such deterioration being, for example, the production of varnish-like deposits on the metal surfaces and of sludge, and viscosity growth. Suitable oxidation inhibitors include ZDDPs, aromatic amines, for example alkylated phenylamines and phenyl alphanapthylamine, hindered phenols, alkaline earth metal salts of sulphurized alkyl-phenols having preferably $C_5$ to $C_{12}$ alkyl side chains, e.g., calcium nonylphenyl sulphide; barium octylphenyl sulphide; and phosphosulphurized or sulphurized hydrocarbons.

Other oxidation inhibitors or antioxidants which may be used in lubricating oil compositions comprise oil-soluble copper compounds. The copper may be blended into the oil as any suitable oil-soluble copper compound. By oil-soluble it is meant that the compound is oil-soluble under normal blending conditions in the oil or additive package. The copper compound may be in the cuprous or cupric form. The copper may, for example, be in the form of a copper dihydrocarbyl thio- or dithio-phosphate. Alternatively, the copper may be added as the copper salt of a synthetic or natural carboxylic acid. Examples of suitable acids include $C_8$ to C18 fatty acids, such, for example, as stearic or palmitic acid, but unsaturated acids such, for example, as oleic acid or branched carboxylic acids such, for example, as naphthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $R_c R_d (NC-SS)_z Cu$, where z is 1 or 2, and $R_c$ and $R_d$ are the same or different hydrocarbyl radicals containing from 1 to 18, and preferably 2 to 12, carbon atoms, and including radicals such, for example, as alkyl, alkenyl, aryl, aralkyl, alkaryl and cycloaliphatic radicals. Particularly preferred as $R_c$ and $R_d$ groups are alkyl groups of from 2 to 8 carbon atoms. Thus, the radicals may, for example, be ethyl, n-propyl, i-propyl, n-buryl, i-butyl, sec-butyl, amyl, n-hexyl, i-hexyl, n-heptyl, n-octyl, deoyl, dodecyl, octadecyl, 2-ethylhexyl, phenyl, butylphenyl, cyclohexyl, methylcyclopentyl, propenyl, or butenyl radicals. In order to obtain oil solubility, the total number of carbon atoms (i.e. the carbon atoms in $R_c$ and $R_d$) will generally be about five or greater. Copper sulphonates, phenates, and acetylacetonates may also be used.

Examples of useful copper compounds are copper $Cu^I$ and/or $Cu^{II}$ salts derived from an alkenyl succinic acids or anhydride. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such, for example, as cupric or cuprous hydroxides, oxides, acetates, borates, and carbonates or basic copper carbonate.

Examples of these metal salts are Cu salts derived from polyisobutenyl succinic anhydride, and Cu salts of polyisobutenyl succinic acid. Preferably, the copper is in its divalent form, $Cu^{II}$. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, for example, a mineral oil, and heated in the presence of a water solution (or slurry) of the metal-bearing material to a temperature of about 70° C. to about 200° C. Temperatures of 100° C. to 140° C. are normally adequate. It may be necessary, depending upon the salt produced, not to allow the reaction mixture to remain at a temperature above about 140° C. for an extended period of time, e.g., longer than 5 hours, or decomposition of the salt may occur.

The copper antioxidants (e.g., Cu-polyisobutenyl succinate, Cu-oleate, or mixtures thereof) will generally be employed in an amount of from about 50 to 500 ppm by weight of the copper, in the final lubricating composition.

Friction modifiers and fuel economy agents which are compatible with the other ingredients of the final oil may also be included. Examples of such materials are glyceryl monoesters of higher fatty acids, for example, glyceryl mono-oleate, esters of long chain polycarboxylic acids with diols, for example, the butane diol ester of a dimerized unsaturated fatty acid, and oxazoline compounds.

Dispersants maintain oil-insoluble substances, resulting from oxidation during use, in suspension in the fluid, thus preventing sludge flocculation and precipitation or deposition on metal parts. So-called ashless dispersants are organic materials which form substantially no ash on combustion, in contrast to the metal-containing (and thus ash-forming) detergents described above. Suitable dispersants include, for example, derivatives of long chain hydrocarbon-substituted carboxylic acids in which the hydrocarbon groups contain 50 to 400 carbon atoms, examples of such derivatives being derivatives of high molecular weight hydrocarbyl-substituted succinic acid. Such hydrocarbon-substituted carboxylic acids may be reacted with, for example, a nitrogen-containing compound, advantageously a polyalkylene polyamine, or with an ester. Such nitrogen-containing and ester dispersants are well known in the art. Particularly preferred dispersants are the reaction products of polyalkylene amines with alkenyl succinic anhydrides.

In general, suitable dispersants include oil soluble salts, amides, imides, oxazolines and esters, or mixtures thereof, of long chain hydrocarbon-substituted mono and dicarboxylic acids or their anhydrides; long chain aliphatic hydrocarbons having a polyamine attached directly thereto; and Mannich condensation products formed by condensing about 1 molar proportion of a long chain substituted phenol with about 1 to 2.5 moles of formaldehyde and about 0.5 to 2 moles of a polyalkylene polyamine. In these dispersants long chain hydrocarbon groups are suitably derived from polymers of a $C_2$ to $C_5$ monoolefin, the polymers having a molecular weight of about 700 to about 5000.

As indicated above, a viscosity index improver dispersant functions both as a viscosity index improver and as a dispersant. Examples of viscosity index improver dispersants suitable for use in accordance with the invention include reaction products of amines, for example polyamines, with a hydrocarbyl-substituted mono- or dicarboxylic acid in which the hydrocarbyl substituent comprises a chain of sufficient length to impart viscosity index improving properties to the compounds. In general, the viscosity index improver dispersant may be, for example, a polymer of a $C_4$ to $C_{24}$ unsaturated ester of vinyl alcohol or a $C_3$ to $C_{10}$ unsaturated mono-carboxylic acid or a $C_4$ to $C_{10}$ dicarboxylic acid with an Unsaturated nitrogen-containing monomer having 4 to 20 carbon atoms; a polymer of a $C_2$ to $C_{20}$ olefin with an unsaturated $C_3$ to $C_{10}$ mono- or dicarboxylic acid neutralised with an amine, hydroxyamine or an alcohol; or a polymer of ethylene with a $C_3$ to $C_{20}$ olefin further reacted either by grafting a $C_4$ to $C_{20}$ unsaturated nitrogen—containing monomer thereon or by grafting an unsaturated acid onto the polymer backbone and then reacting carboxylic acid groups of the grafted acid with an amine, hydroxy amine or alcohol.

Examples of dispersants and viscosity index improver dispersants which may be used in accordance with the invention may be found in European Patent Specification No. 24146 B, the disclosure of which is incorporated herein by reference.

Antiwear agents include zinc dihydrocarbyl dithiophosphates (ZDDPs).

Pour point depressants, otherwise known as lube oil flow improvers, lower the temperature at which the fluid will flow or can be poured. Such additives are well known. Typical of those additives which improve the low temperature fluidity of the fluid are $C_8$ to $C_{18}$ dialkyl fumarate/vinyl acetate copolymers, polymethacrylates, and wax naphthalene. Foam control can be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

Compositions when containing the above-mentioned additives are typically blended into the base oil in amounts which are effective to provide their normal function. Representative effective amounts of such additives, if present, are illustrated as follows:

| Additive | Mass a.i.* (Broad) | Mass % a.i.* (Preferred) |
| --- | --- | --- |
| Detergents/Rust inhibitors | 0.01–6 | 0.01–4 |
| Viscosity Modifier | 0.01–6 | 0.01–4 |
| Corrosion Inhibitor | 0.01–5 | 0.01–1.5 |
| Oxidation Inhibitor | 0.01–5 | 0.01–1.5 |
| Dispersant | 0.1–20 | 0.1–8 |
| Pour Point Depressant | 0.01–5 | 0.01–1.5 |
| Anti-Foaming Agent | 0.001–3 | 0.001–0.15 |
| Anti-wear Agents | 0.01–6 | 0.01–4 |
| Friction Modifier | 0.01–5 | 0.01–1.5 |
| Mineral or Synthetic Base Oil | Balance | Balance |

*Mass % active ingredient based on the final oil.

When a plurality of additives are employed it may be desirable, although not essential, to prepare additive concentrates comprising the additives (the concentrate being referred to herein as an additive package) whereby several additives can be added simultaneously to the base oil to form the lubricating oil composition. Dissolution of the additive concentrate into the lubricating oil may be facilitated, for example, by mixing accompanied with heating, but this is not essential. The concentrate or additive package will typically be formulated to contain the additive(s) in proper amounts to provide the desired concentration in the final formulation when the additive package is combined with a predetermined amount of base lubricant. Thus, one or more overbased magnesium sulphonates prepared in accordance with the present invention can be added to small amounts of base oil or other compatible solvents along with other desirable additives to form additive packages containing active ingredients in an amount, based on the additive package, of, for example, from about 2.5 to about 90 mass %, and preferably from about 5 to about 75 mass %, and most preferably from about 8 to about 50 mass % by weight, additives in the appropriate proportions with the remainder being base oil.

The final formulations may employ typically about 10 mass % of the additive-package with the remainder being base oil.

The following Examples illustrate the invention. The magnesium oxides used in the Examples and Comparative Examples had the characteristics indicated in Table I, the citric acid number, surface area and purity being measured as hereinbefore described.

TABLE I

| MgO | Citric acid no. (secs) | Surface area (m²/g) | Mean particle size (μm) | Vol. less than 2 μm % | Purity % |
| --- | --- | --- | --- | --- | --- |
| A | 445 | 5.4 | 10.7 | 0.7 | 99.6 |
| B | 329 | 6.7 | 3.3 | 5.2 | 98.9 |
| C | 225 | 9.7 | 3.5 | 3.8 | 98.0 |
| D | 600 | 2.8 | 4.9 | 2.8 | 98.1 |
| E | 43 | 45.5 | 11.5 | 1.5 | 95.0 |
| F | 44 | 38.0 | 8.3 | 8.3 | 95.6 |
| G | 23 | 60.4 | 12.9 | 1.8 | 98.2 |
| H | 105 | 19.9 | 3.7 | 5.2 | 97.6 |
| J | 160 | 13.5 | 3.1 | 4.0 | 98.5 |
| K | 21 | 181 | 8.0 | 9.3 | 95.5 |
| L | 220 | 16.6 | 9.6 | 7.2 | 91.0 |
| M | 323 | 8.1 | 12.1 | 9.5 | 98.2 |
| N | 129 | 8.2 | 18.7 | 1.9 | 91.0 |

Example 1

800 g of toluene and 360 g (0.37 moles) of a 69.1 mass % solution of an alkyl benzene sulphonic acid (molecular weight 670) in diluent oil were mixed with thorough agitation and heated to 22° C. in a reactor fitted with a reflux condenser, a gas distribution tube and a temperature controller. 15 g (0.47 moles) of methanol were then added. There was an immediate exotherm, as a result of which the temperature rose to 25° C. 150 g (3.72 moles) of magnesium oxide A were then added. There was a rapid exotherm as the sulphonic acid was neutralised, and the temperature rose to 34° C. 24 g (0.14 moles) of neodecanoic acid were added as promoter, followed by 24 g (0.75 mole) of methanol and 38.2 (2.14 mole) of water. The temperature was brought to 55° C. and maintained at that level while commencing, simultaneously, injection of carbon dioxide into the mixture at a rate of 30 g/hour and addition of a mixture of 36 g methanol and 71.5 g water. The methanol/water mixture was added continuously over a 150 minute period, at a substantially constant rate.

During carbonation, the temperature of the carbonation mixture was allowed to follow its natural course and slowly increased to about 70° C. and then fell again as the reaction subsided and the magnesium oxide was consumed. When the temperature had fallen to about 60° C., heat was applied, and the temperature was maintained at 60° C. until carbonation was complete. After 3 hours 20 minutes of carbonation, when 100 g of carbon dioxide had been injected into the mixture, the apparatus was changed from a reflux to a distillation configuration. After a total of 138 g of carbon dioxide had been injected, the rate of injection was increased to 39 g/hour. This rate was maintained until a total of 175 g of carbon dioxide had been passed into the reaction mixture.

On completion of carbonation, a sample was removed from the reaction mixture and centrifuged. There was 0.5 vol. % sediment in the sample.

While maintaining the temperature of the mixture at 60° C., 260 g of diluent oil, also at 60° C., were added, and the mixture so obtained was distilled at atmospheric pressure while introducing a stream of nitrogen. When the distillation temperature reached 165° C., a vacuum was applied, and maintained for a 2 hour period, to remove the last traces of water, methanol and toluene. After releasing the vacuum, a 50 ml sample was removed from the stripped mixture and diluted with 50 ml of toluene. This diluted sample was then centrifuged to show that 0.8 vol % of sediment (PCS) remained in the stripped mixture.

24 g of Speedplus filter aid was added to the stripped mixture in the reactor, and the mixture so obtained was filtered through a pressure filter preheated to 160° C. and containing 5 g of Speedplus filter aid as a precoat. The filtration rate was 492 kg/m²/hour. The filtered product was bright and clear and had a TBN of 408 mg KOH/g.

Examples 2 to 4 and Comparative Examples 1 to 9

The process descried in Example 1 was repeated using different grades of magnesium oxide. The results obtained are summarised in Table II, which also gives the results obtained in Example 1.

TABLE II

| Example or Comp. Ex. | MgO | Sediment End of CO$_2$ (vol. %) | Sediment End of strip (vol. %) | Filtration rate (kg/M$^2$/hr) | TBN mg KOH/g |
|---|---|---|---|---|---|
| Ex. 1 | A | 0.5 | 0.8 | 492 | 408 |
| Ex. 2 | B | 0.4 | 1.0 | 186 | 405 |
| Ex. 3 | C | 0.4 | 0.6 | 223 | 405 |
| Ex. 4 | D | 1.2 | 1.8 | 174 | 402 |
| Comp. 1 | E | 0.5 + 30% gel - abandoned | | | |
| Comp. 2 | F | 2.4 + 30% gel - abandoned | | | |
| Comp. 3 | G | 3.5 + 0.5% gel - gelled during stripping | | | |
| Comp. 4 | H | gelled during carbonation | | | |
| Comp. 5 | J | 2.4 | 4.5 | blocked filter | |
| Comp. 6 | K | 3.0 + 2% gel - abandoned | | | |
| Comp. 7 | L | 0.2 + 20% gel - abandoned | | | |
| Comp. 8 | M | 3.0 + 5% gel - abandoned | | | |
| Comp. 9 | N | 0.3 + 60% gel - gelled during stripping | | | |

The results in Table II show that, whereas products having a high TBN, a low level of sediment, and a relatively rapid filtration rate were obtained when using magnesium oxides in accordance with the invention, the use of magnesium oxides outside the scope of the invention led to unsatisfactory results. For example, Comparative Examples 5 and 7 show that unsatisfactory results were obtained when using magnesium oxides having citric acid numbers and surface areas close to, but outside, the limits specific in accordance with the invention. Further, Comparative Example 8 shows that, even when the citric acid number and surface area are within the limits specified in accordance with the invention, unsatisfactory results are obtained if the magnesium oxide contains a proportion of particles of size less than 2 μm above the limit specified in accordance with the invention. It should be noted that a product containing even a very small amount of gel is normally unsatisfactory because of the tendency of gelled materials to block the filter.

Examples 5 to 8 and Comparative Examples 10 to 15

The process described in Example 1 was repeated using different ratios of methanol introduced before carbonation: methanol introduced during carbonation and water introduced before carbonation: water introduced during carbonation (Examples 5 to 8). (In each case the methanol using to facilitate neutralisation of the sulphonic acid is excluded.)

The processes described in Examples 1 and 2 were repeated with the introduction of all the methanol into the reaction mixture before carbonation (Comparative Examples 10 and 11). Example 1 was also repeated with the introduction of all the methanol and water into the reaction mixture before carbonation (Comparative Example 12), with the introduction of all the methanol during carbonation and all the water before carbonation (Comparative Example 13), with the introduction of all the methanol and all the water before carbonation (Comparative Example 14), and with the introduction of some of the methanol and all of the water during carbonation (Comparative Example 15).

The results obtained are given in Table III, which also gives, for comparative purposes, details for Examples 1 and 2.

TABLE III

| Example or Comp. Ex. | MeOH during carbonation (%) | H$_2$O during carbonation (%) | Sediment End of CO$_2$ (vol. %) | Sediment End of strip (vol. %) | Filtration rate kg/m$^2$/hr | TBN mg KOH/g |
|---|---|---|---|---|---|---|
| Ex. 1 | 60 | 65 | 0.5 | 0.8 | 492 | 408 |
| Ex. 2 | 60 | 65 | 0.4 | 1.0 | 186 | 405 |
| Ex. 5 | 50 | 50 | 1.0 | 1.0 | 460 | 412 |
| Ex. 6 | 20 | 20 | 1.6 | 2.8 | 250 | 402 |
| Ex. 7 | 10 | 10 | 1.8 | 3.0 | 128 | 403 |
| Ex. 8 | 100 | 65 | 1.3 | 1.6 | 153 | 407 |
| Comp. 10 | 0 | 65 | 6.5 | 8.5 - abandoned | | |
| Comp. 11 | 0 | 65 | 8.0 | 9.0 - blocked filter | | |
| Comp. 12 | 0 | 0 | 13.0 | abandoned | | |
| Comp. 13 | 100 | 0 | 2.0 | 3.0 - blocked filter | | |
| Comp. 14 | 100 | 100 | 1.8 | 3.6 - blocked filter | | |
| Comp. 15 | 60 | 100 | 2.0 | 3.5 - blocked filter | | |

Table III demonstrates that satisfactory results are only obtained when at least part of the methanol and part only of the water are introduced into the reaction medium during carbonation.

Example 9

720 g of toluene and 365 g (0.53 moles) of a 70 mass % solution of an alkyl benzene sulphonic acid (molecular weight 480) in diluent oil were mixed with through agitation and heated to 22° C. in a reactor as described in Example 1 fitted with a reflux condenser, a gas distribution tube and a temperature controller. 13 g of methanol were then added. There was an immediate exotherm, as a result of which the temperature of the mixture rose to 25° C. 154 g (3.82 moles) of magnesium oxide A were then added. There was a rapid exotherm as the sulphonic acid was neutralised, and the temperature rose to 36° C. 14.5 g (0.069 moles) of octenyl succinic anhydride were added as promoter, followed by 29.3 g of methanol and 40 g of water. The temperature of the mixture was brought to 55° C. and maintained at that level while commencing, simultaneously, injection of carbon dioxide into the mixture at a rate of 39 g/hour and addition of a mixture of 73.7 g methanol and 90 g water. The methanol/water mixture was added continuously over a 60 minute period, and at a substantially constant rate.

During carbonation, the temperature of the carbonation mixture was allowed to follow its natural course and slowly increased to about 70° C. and then fell again as the reaction subsided and the magnesium oxide was consumed. When the temperature had fallen to 60° C., heat was applied, and the temperature was maintained at 60° C. until carbonation was complete. When 138 g of carbon dioxide has been injection into the carbonation mixture, the apparatus was changed from a reflux to a distillation configuration. Carbonation was continued until 175 g of carbon dioxide had been passed into the reaction mixture.

On completion of carbonation, a sample was removed from the reaction mixture and centrifuged. There was 0.8 volume % of sediment in the sample.

While maintaining the temperature of the mixture at 60° C., 260 g of diluent oil, also at 60° C., were added, and the mixture so obtained was distilled at atmospheric pressure while introducing a stream of nitrogen. When the distillation temperature reached 165° C., a vacuum was applied, and maintained for a two hour period, to remove the last traces of water, methanol and toluene. After releasing the vacuum, a 50 ml sample was removed from the stripped mixture and dissolved in 50 ml of toluene. The diluted sample was centrifuged to show that 1.0 vol. % of sediment (PCS) remained in the stripped mixture.

8 g of filter aid was then added to the stripped mixture in the reactor, and the mixture so obtained was filtered through a pressure filter preheated to 160° C. and containing 5 g of filter aid as a precoat. Filtration was very rapid, at a rate of 918 kg/m$^2$/hour. The filtered product was bright and clear and had a TBN of 426 mg KOH/g.

Comparative Example 16

Example 9 was repeated, with the introduction of all of the methanol and water before the commencement of carbonation. The sediment level was 6 vol. % before stripping and 10 vol. % after stripping, and the stripped product blocked the filter, showing that satisfactory results are not obtained when all the methanol and water are introduced before carbonation.

Example 10

Example 9 was repeated with the following changes:

360 g of a sulphonic acid solution as described in Example 1 were used;

151.3 g of magnesium oxide A were used;

a mixture of 10 g of formic acid and 13 g of acetylacetone was used as promoter;

the charges of methanol (excluding methanol used in the neutralisation step) and water before carbonation were 20.6 g and 27.5 g respectively;

the amounts of methanol and water added during carbonation were 61.9 and 82.5 g respectively;

the initial temperature for carbonation was 40° C., and the temperature increased to about 65° C. before falling to 60° C., where it was maintained for the remainder of the carbonation period;

267 g of diluent oil were used.

On completion of carbonation, a sample contained 1.0 vol. % sediment. After stripping, the sediment level was 2.0 vol %. The filtration rate was 210 kg/m$^2$/hour. The product was clear and bright with a TBN of 403 mg KOH/g.

Comparative Example 17

Example 10 was repeated, with the introduction of all the methanol and water before the commencement of carbonation. The sediment at the end of carbonation was 8 vol. %, which was unacceptably high.

Example 11

Example 9 was repeated with the following changes:

360 g of a sulphonic acid solution as described in Example 1 were used;

24 g of neodecanoic acid were used as promoter;

the methanol and water charges before carbonation (excluding methanol used in the neutralisation step) were 17.5 g and 27.5 g respectively;

the methanol and water charges during carbonation were 62.5 and 82.5 g respectively;

the methanol/water mixture was added during the first 90 minutes of carbonation.

On completion of carbonation, a sample contained 0.8 vol. % sediment. After stripping, the sediment level was 1.6 vol. %. The filtration rate was 321 kg/m$^2$/hour. The finished product was bright and clear with a TBN of 407 mg KOH/g.

Comparative Example 18

Example 11 was repeated, with the introduction of all the methanol and water before the commencement of carbonation. The sediment at the end of carbonation was 13 vol. %, and the experiment was abandoned.

Example 12 to 14 and Comparative Examples 19 and 20

Example 9 was repeated using various amounts of neodecanoic acid as promoter and, in some cases, introducing all the methanol and water into the reaction mixture before the commencement of carbonation. The amount of diluent oil added during distillation was varied depending on the amount of decanoic acid used. The results obtained are summarised in Table IV:

TABLE IV

| Example/Comp. Ex. | Comp. Ex. 19 | Example 12 | Example 13 | Example 14 | Comp. Ex. 20 |
|---|---|---|---|---|---|
| Neodecanoic acid (g) | 96 | 48 | 24 | 12 | 12 |
| water before carbonation (g) | 130 | 40 | 40 | 40 | 130 |
| Methanol before carbonation (g) | 102.5 | 29 | 29 | 29 | 102.5 |
| Water during carbonation (g) | 0 | 90 | 90 | 90 | 0 |
| Methanol during carbonation (g) | 0 | 73.5 | 73.5 | 73.5 | 0 |
| Sediment after carbonation (vol. %) | 0.6 | 0.25 | 0.4 | 1.1 | 10 |
| Diluent oil (g) | 200 | 260 | 260 | 276 | Abandoned |
| Sediment after stripping (vol. %) | 1.2 | 0.4 | 0.6 | 1.4 | Abandoned |
| Filtration rate (kg/m²/hour) | 295 | 2360 | — | 484 | Abandoned |
| TBN (mg KOH/g) | 405 | 414 | 415 | 412 | Abandoned |
| Kinematic viscosity (cSt)* | — | 107.4 | — | 77.7 | Abandoned |

*1 cSt = $10^{-6}$ m²/s

Table IV shows that the addition of part of the methanol and water during carbonation made it possible to obtain satisfactory results using greatly reduced amounts of the promoter.

Example 15

Example 9 was repeated with the following changes:

28 g of an ethylenediamine carbamate solution, comprising 35.5 mass % water, 35.5 mass % methanol, 16.8 mass % ethylene diamine and 12.2 mass % carbon dioxide, was used as promoter;

the charges of methanol (excluding methanol used in the neutralisation step) and water before carbonation were 20.6 g and 30.1 g respectively;

the temperature of the carbonation mixture at the commencement of carbonation was 40° C.;

the amounts of methanol and water added during carbonation were 61.8 and 90.2 g respectively;

the total amount of methanol in the system (including the methanol used in the neutralisation step and that in the promoter solution) was 105.3 g;

the total amount of water in the system (including the water in the promoter solution) was 130.2 g;

the methanol/water mixture was added during the first 90 minutes of the carbonation period.

On completion of carbonation a sample contained 0.6 vol. % sediment. After stripping, the sediment level was 1.0 vol. %. The filtration rate was 450 kg/m²/hr. The finished product was bright and clear with a TBN of 431 mg KOH/g.

Comparative Example 21

Example 15 was repeated, with the introduction of all the methanol and water into the reaction mixture before carbonation. The results obtained are given in Table V below.

Comparative Example 22

Comparative Example 21 was repeated using 57 g of the promoter solution and with slight variations in the methanol and water charges. The results obtained are given in Table V.

TABLE V

| Example/Comp. Ex. | Example 15 | Comp. Ex. 21 | Comp. Ex. 22 |
|---|---|---|---|
| Promoter Solution (g) | 28 | 28 | 57 |
| Initial methanol (g) | 13 | 13 | 15 |
| Water before carbonation (g) | 30.1 | 120.3 | 110 |
| Methanol before carbonation (g) | 20.6 | 82.4 | 80 |
| Water during carbonation (g) | 90.2 | 0 | 0 |
| Methanol during carbonation (g) | 61.8 | 0 | 0 |
| Total methanol (g) | 105.3 | 105.3 | 115.2 |
| Total water (g) | 130.2 | 130.2 | 130.2 |
| Sediment after carbonation (vol. %) | 0.6 | 5.0 | 1.0 |
| Sediment after stripping (vol. %) | 1.0 | 10 | 1.3 |
| Filtration rate (kg/m²/hour) | 450 | Filter blocked | 823 |
| TBN (mg KOH/g) | 431 | — | 435 |

Table V shows that the addition of part of the methanol and water during carbonation made it possible to obtain satisfactory results using a greatly reduced amount of promoter.

We claim:

1. A process for the production of an overbased magnesium sulphonate oil solution comprising: (a) preparing a mixture comprising:

1 an oil-soluble sulphonate or an oil-soluble sulphonic acid;

2 from 1 to 45 equivalents or magnesium oxide per equivalent of oil soluble sulphonate or sulfonic acid 3 a hydrocarbon solvent in which the sulphonate or sulphonic arid of 1 and the overbased magnesium sulphonate are at least partially soluble;

4 water;

5 water-soluble $C_1$–$C_5$ alcohol; and promoter comprising at least one substance selected from amines, organic acids, ammonia, ammonium compounds, ketones, and anhydrides.

(b) carbonating the mixture wherein additional Water and optionally additional alcohol are introduced into the mixture during carbonation, and (c) thereafter filtering the mixture at a rate of at least 150 kg/m²/hr to remove any solids, wherein the magnesium oxide has a citric acid number of 200 seconds to 700 seconds, a surface area measured by the BET single point method of less than 12 m²/g, and at least 92 volume % of its particles are greater than 2 μm, and wherein the magnesium oxide has a purity as measured by EDTA titration of at least 95%, wherein the total amount of water introduced into the mixture, including say introduced before carbonation but excluding water generated by chemical reactions, is at lust 0.5 mole per mole of magnesium present in the amount of magnesium oxide large enough to produce sufficient colloidal magnesium derivatives to provide a high TBN (d) stripping water, alcohol, and volatile solvents prior to or following step (c).

2. A process as claimed in claim 1 wherein the magnesium oxide has a citric acid number in the range of from 200 to 600 seconds.

3. A process as claimed in claim 2 wherein the magnesium oxide has a surface area measured by the BET single point method in the range of from 2 to 10 m²/g.

4. A process as claimed in claim 3 wherein at least 94 volume % of the magnesium oxide has a particle size of greater than 2 μm.

5. A process as claimed in claim 1 wherein the total amount of water introduced into the mixture, including any introduced before carbonation but excluding water generated by chemical reactions, is at least 1 mole per mole of magnesium oxide available to form colloidally dispersed basically reacting products.

6. A process as claimed in 5 wherein 10 to 90 mass % of the total amount of introduced water is present in the mixture before commencement of carbonation.

7. A process as claimed in claim 1 wherein at least 10 mass % of the total mount of the alcohol excluding any alcohol used in step (a) is introduced into the mixture during carbonation.

8. A process as claimed in claim 7 wherein the water and alcohol introduced into the mixture during carbonation is introduced substantially continuously.

9. A process as claimed in claim 8 wherein the water and alcohol introduced into the mixture during carbonation are introduced together.

10. A process as claimed in claim 9 wherein the water and alcohol introduced during carbonation are introduced over at least the first 20% of the carbonation period.

11. A process as claimed in claim 1 wherein the promoter comprises a carboxylic acid with 8 to 10 carbon atoms or a substituted succinic acid or anhydride.

* * * * *